United States Patent [19]
Dworski

[11] 3,899,847
[45] Aug. 19, 1975

[54] FISH LURE

[76] Inventor: Michael Dworski, 4708 Kane Pl., Jupiter, Fla. 33458

[22] Filed: Jan. 2, 1974

[21] Appl. No.: 429,572

Related U.S. Application Data

[63] Continuation-in-part of Ser. Nos. 255,401, May 22, 1972, abandoned, and Ser. No. 260,112, June 6, 1972, abandoned.

[52] U.S. Cl. ............. 43/42.09; 43/42.15; 43/42.21; 43/42.36
[51] Int. Cl............................................ A01k 85/00
[58] Field of Search............. 43/42.09, 42.15, 42.21, 43/42.36

[56] References Cited
UNITED STATES PATENTS

| | | | |
|---|---|---|---|
| 1,725,636 | 8/1929 | Heaslip | 43/42.21 |
| 2,078,816 | 4/1937 | Shenitz | 43/42.21 X |
| 2,435,993 | 2/1948 | Zink | 43/42.36 X |
| 2,971,285 | 2/1961 | Murawski | 43/42.15 X |
| 3,490,165 | 1/1970 | Thomassin | 43/42.09 |

Primary Examiner—Louis G. Mancene
Assistant Examiner—Daniel J. Leach
Attorney, Agent, or Firm—Charles S. McGuire

[57] ABSTRACT

An improved fish lure in the nature of an artificial minnow having head and tail portions and a central portion comprising a plurality of longitudinally spaced, radially extending fins or ribs provided as separate elements arranged in abutting relation with the line or leader extending loosely through a longitudinal opening in all elements. The rib elements have planar edges and are disclosed in a number of embodiments including different means of holding the elements in spaced relation, reducing the weight thereof, and imparting spin to the minnow, as it is drawn through the water. Additional embodiments provide for oscillation rather than spinning as the minnow moves through the water by forming the axis of the minnow in a curve, and for forming the minnow in a single piece with the ribs extending fully or only partially around the body.

24 Claims, 18 Drawing Figures

3,899,847

FISH LURE

REFERENCE TO RELATED APPLICATIONS

This application is a continuation-in-part of U.S. applications Ser. Nos. 255,401, filed May 22, 1972, and 260,112, filed June 6, 1972, both of which prior applications are now abandoned.

BACKGROUND OF THE INVENTION

This invention relates to fish lures or artificial minnows and, more particularly, to an improved artificial minnow of the type having a plurality of longitudinally spaced fins or ribs extending radially from a central body portion.

In U.S. Pat. No. 3,621,600 issued to the present applicant on Nov. 21, 1971, there is disclosed an artificial minnow comprising a plurality of separate elements which are releasably connected to form a completed unit which may vary in length, depending on the number of such elements used. The elements include a plurality of spaced fins or ribs extending radially from the body of the minnow and passing around at least the central portion of the body. Each rib has a notch or groove in the peripheral edge extending around the outer surface thereof. The separate elements are threaded or snapped together with positive retaining means when the unit is assembled.

SUMMARY OF THE INVENTION

The artificial minnow of the present invention, in contrast to that disclosed in the aforementioned patent, has planar peripheral edges on the spaced fin or rib elements. This allows more economical manufacture, especially when the elements are fabricated of molded plastic. Furthermore, a complete unit made up of several separate elements is provided without positive retaining means, such as threads or snap locks, between adjacent elements. Several embodiments of individual rib elements having various advantageous features are disclosed. The rib elements may be frictionally engaged with one another, as well as with separate head and tail sections, or may be held together by spring force or merely by the force generated by drawing the minnow through the water.

In one embodiment the rib elements are formed with abutting surfaces which allow assembly with either a straight or a curved body axis. In all embodiments the minnor may be made to spin about its axis when the axis is straight, and oscillation, either fast or slow, is provided by curving the body axis.

It is a principal object of the invention to provide an improved artificial minnow of the type incorporating a plurality of spaced, radial ribs which is more economical in manufacture.

Another object is to provide an artificial minnow which may be selectively assembled from a number of separate elements with a line or leader passing loosely through the assembled unit with provision for imparting spin as the minnow is drawn through the water.

Still another ojbect is to provide a fish lure of the character indicated having lower weight and improved bearing means for allowing the lure to spin relative to the hook and line or leader with which it is associated.

A still further object is to provide an artificial minnow with a curved body axis for producing oscillation as the minnow moves through the water, and means for optionally producing fast or slow oscillation.

Other ojbects will in part be obvious and will in part appear hereinafter.

DETAILED DESCRIPTION

Figure 1:
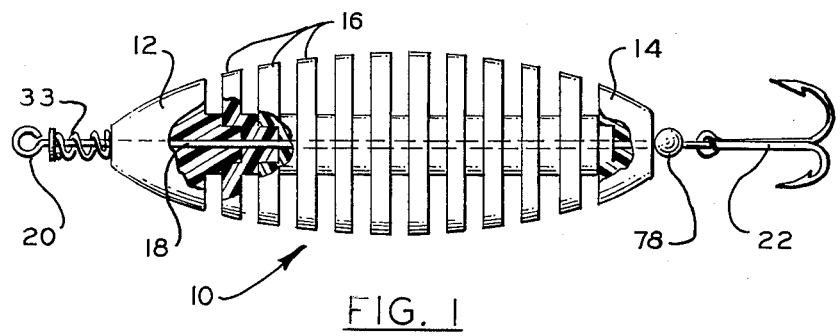
FIG. 1 is a side elevational view of one embodiment of the invention, partly in section, showing the elements in assembled condition.

Referring now to the drawings, in FIG. 1 is shown a fish lure in the nature of an artificial minnow 10 made up of a number of separate elements, including head and tail portions 12 and 14, respectively, and a purality of intermediate rib elements 16. Each of the rib elements and head and tail portions have a central opening extending therethrough for passage of the fishing line or leader 18 having eye 20 on the forward end and hook 22 attached to the rearward end.

The rib elements may be provided in a variety of embodiments, reference numeral 16 being used to designate generally the complete element in each embodiment. The embodiment of FIGS. 2 and 3 includes principal disc-like portion 24 with recess 26 extending into one surface thereof, and cylindrical bosses 28 and 30 of two different diameters extending outwardly from the other surface. The diameter of boss 30 is substantially the same, or slightly smaller than, the diameter of recess 26 so that a plurality of elements 16 may be assembled to form a unitary structure as shown in FIG. 1. With boss 30 of one rib element inserted in opening 26 of an adjacent element, principal portions 24 of the two elements are held in spaced relation by the larger boss 28. This is clearly evident from the sectional portion of FIG. 1. Head and tail portions 12 and 14 also include bosses and recesses for cooperative engagement with adjacent rib elements 16.

The diameters of the bosses and recesses may be such that a tight frictional engagement between adjacent elements is provided, or the bosses may fit more loosely into the recesses. In either case, each of the elements includes central opening 32 for passage of the line or leader. Openings 32 are significantly larger than the line or leader which passes therethrough so that the minnow is freely rotatable about the line. Light spring 33 may be provided as indicated in FIG. 1 to maintain the elements in engagement, if desired.

Figure 4:
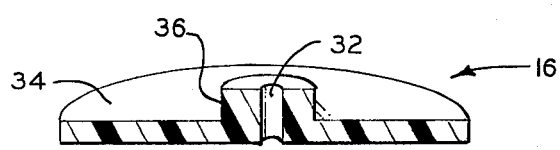
FIGS. 4 and 5 are perspective views in half section of two other embodiments connecting means for the element of FIGS. 2 and 3.

The embodiment of element 16 shown in FIG. 4 includes only principal portion 34 and boss 36. No recess is provided, adjacent elements being spaced by each boss 36 but not otherwise engaged. Spring 33, or merely the force exerted on the elements by drawing the lure through the water, may be provided to maintain the elements in adjacent, contacting relation.

Figure 5:
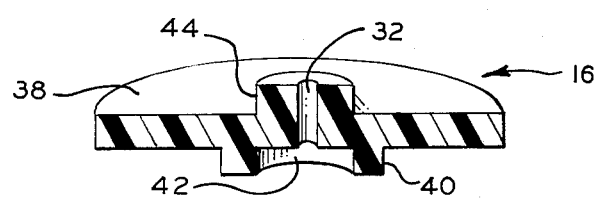

The element 16 of FIG. 5 includes principal portion 38, having lip 40 defining recess 42 extending from one surface, and boss 44 extending from the opposite surface. The diameter of boss 44 on each element is substantially equal to the diameter of recess 42. Thus, boss 44 may extend into recess 42 of an adjacent element and the two will be held in spaced relation by lip 40.

Figure 2:
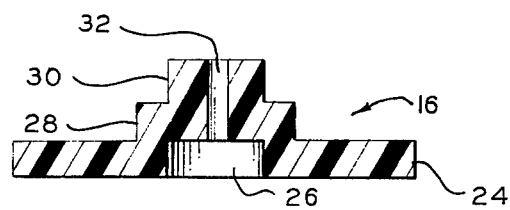
FIG. 2 is a side elevational view in half section of one of the individual elements shown in FIG. 1.
Figure 3:
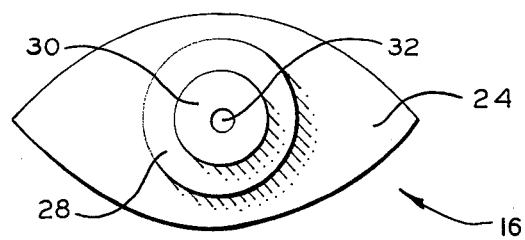
FIG. 3 is a front elevational view of the element of FIG. 2.
Figure 6:
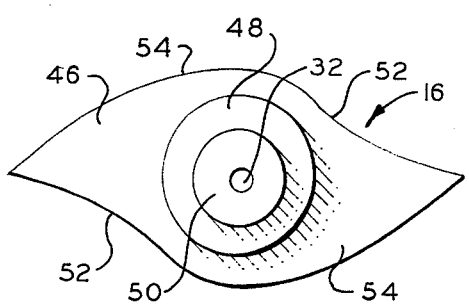
FIGS. 6 and 7 are front elevational views of two other embodiments of peripheral shapes of the element of FIGS. 2 and 3.
Figure 7:
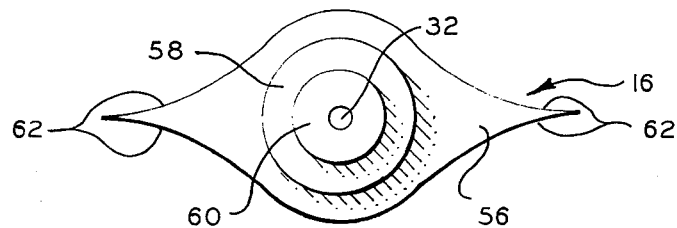

The embodiments of FIGS. 6 and 7 are illustrated as employing the double boss engagement means of the FIGS. 2 and 3 embodiment, but may use any of those previously described. These embodiments, however, are of different peripheral shape than the previously described embodiments. Element 16 of FIG. 6 includes principal portion 46 with large and small bosses 48 and 50, respectively, extending therefrom. From each of the pointed ends the peripheral surfaces extend in a concave manner on each side 52 and in a convex manner on the other side 54. Thus, each concave surface joins a convex surface between the two ends. The embodiment of elements 16 shown in FIG. 6 has the advantage of lower weight than the double convex (i.e., oblong with pointed ends) embodiment of FIG. 3, and can more easily be relatively arranged to form a helical pattern along the length of the minnow, thereby imparting spin as the minnow is drawn through the water. That is, each successive one of elements 16 may be angularly offset in the same direction along the length of the minnow. The cumulative angular offset will produce a helically disposed assembly of elements 16, which may be employed with any of the disclosed peripheral shapes of elements 16 to impart spin.

The embodiment of element 16 shown in FIG. 7 includes principal portion 56, having large and small bosses 58 and 60 extending therefrom. The peripheral shape of this embodiment is defined by double concave surfaces 62 extending from both sides of both pointed ends and meeting in convex surfaces around the central portion. Head portion 64 of FIG. 8 includes concave surfaces 66 to reduce weight. This embodiment of head portion is preferably used in combination with elements 16 of the FIG. 7 embodiment for maximum weight reduction. Surfaces 66 may be helically disposed to impart more spin to the minnow.

Figures 8, 10, 11:
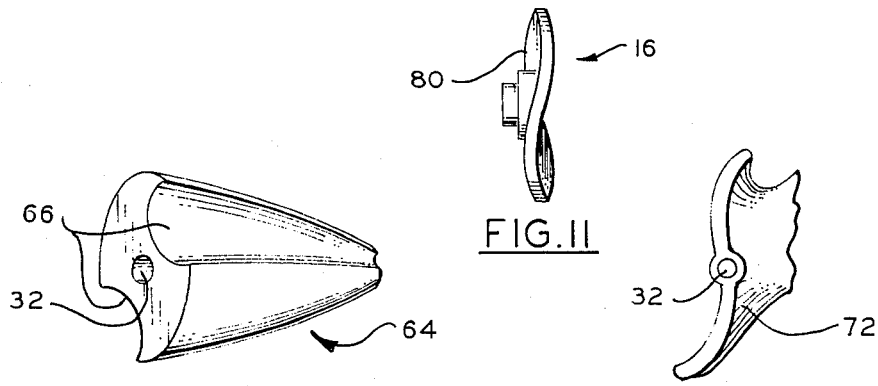
FIG. 8 is a perspective view of another embodiment of a different portion of FIG. 1.
FIG. 10 is a fragmentary, perspective view of one end of the FIG. 9 embodiment.
FIG. 11 is a side elevational view of yet another embodiment of the element of FIGS. 2 and 3.
Figure 9:
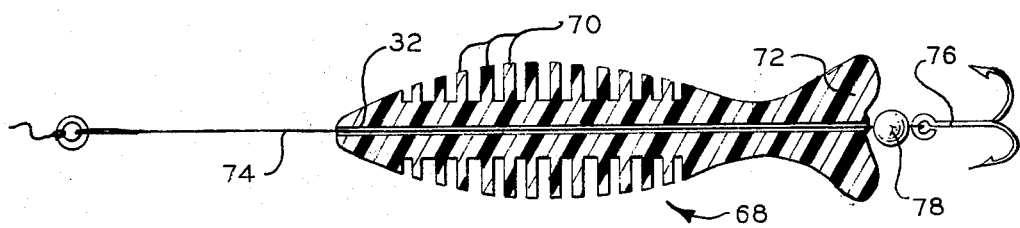
FIG. 9 is a side elevational view of half section of another embodiment of the invention, shown in assembled condition.

In FIG. 9 is shown a second embodiment 68 of the minnow, molded as a single unit in one piece of plastic. Spaced radial ribs 70 are again provided, with planar peripheral surfaces. Tail portion 72 is of thin cross section and helical (see FIG. 10) to impart spin. Minnow 68 includes axial opening 32 as in the previous embodiment for the passage of line or leader 74, having hook 76 attached to the end thereof. Spherical bearing or bead 78 is arranged on line 74 between minnow 68 and hook 76. This provides a low friction contact for tail 72, which may be provided with an extending boss or shoulder (not shown) to contact the bead so that the minnow will spin more freely. Bead 78 may also be employed with the earlier described minnow embodiment, as shown in FIG. .1. The spinning action may also be imparted by forming elements 70 with a transverse twist, in the nature of a propeller blade, as shown in FIG. 11 wherein body portion 80 is so formed.

Although elements 16 are shown in FIG. 1 as being of different diameters, producing a minnow which tapers from the center toward the ends, it is also contemplated that a construction of uniform sized rib elements may be employed, with only the head and tail portions tapered. This would provide the advantage of interchangeability of parts while retaining the other advantageous features. Furthermore, the head and tail portions only could be used, without intermediate rib elements, to provide a lure in the nature of a foreshortened plug. In such case, helical surfaces on the head and/or tail, as previously disclosed, would impart spin.

Figure 12:
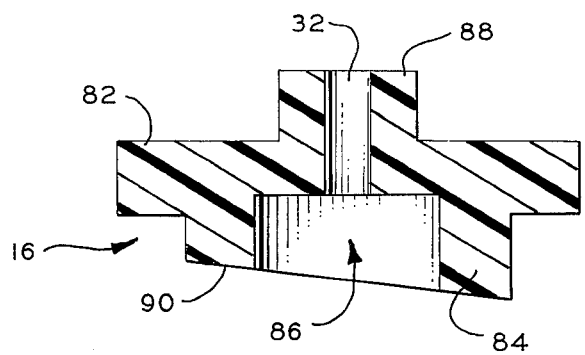
FIG. 12 is a side elevational view in half section of still another embodiment of element such as shown in FIGS. 2 and 3.

Turning now to FIG. 12, there is shown an embodiment of element 16 similar to that of FIG. 5, including principal portion 82 having lip 84 defining recess 86 extending from one side thereof, and boss 88 extending from the opposite surface. Opening 32 extends centrally through the element, as in the other embodiments. It will be noted, however, that surface 90 of lip 84 is not in a plane normal to the axis of opening 32. Thus, elements 16 of the FIG. 12 embodiment may be assembled to form the body portion of an artificial minnow with either a curved or a straight body axis, as shown in FIGS. 13 and 14, respectively.

Figure 13:
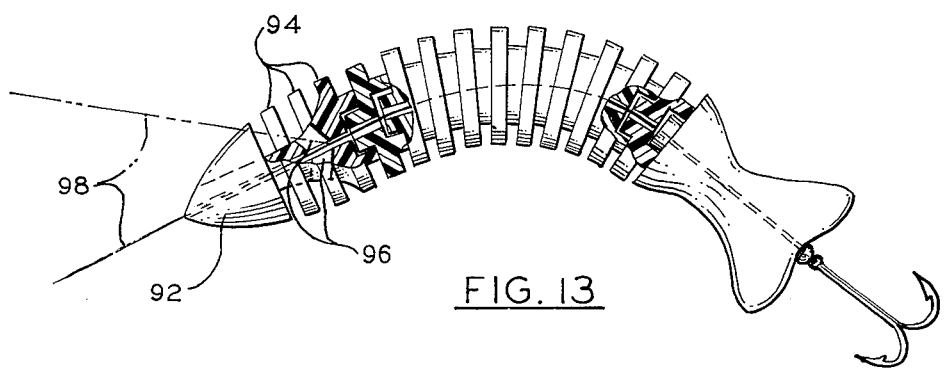
FIG. 13 is a plan view of an embodiment of the invention assembled in a first manner with the elements of FIG. 12.

When the individual elements are rotationally oriented so that the angular offset of surface 90 of each element is cumulative, the minnow will have a curved body axis, as in FIG. 13. Head portion 92 may have one or more ribs, such as 94, formed therein, and also includes a longitudinal opening as in previous embodiments. In addition head portion 92 includes lateral opening 96, communicating with the central opening and extending either half-way or completely through the head portion. Leader 98 may be threaded through the longitudinal opening, as shown in solid line, or the lateral opening, shown in dotted line. In either case, the minnow will oscillate or wiggle as it is drawn through the water. When the leader extends through the longitudinal opening, oscillation is at a slower rate than when it extends through the lateral opening. Hooks may be attached to head portion adjacent the lateral openings, if desired.

Figure 14:
FIG. 14 is a plan view of a portion of the FIG. 13 embodiment with the elements assembled in a different manner.
Figure 15:
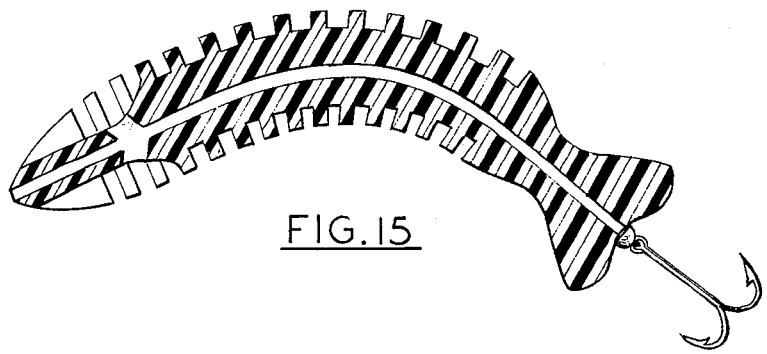
FIG. 15 is a plan view in half section of an embodiment similar to FIG. 13.

If the elements are rotationally oriented so that the angular offset of succeeding elements is reversed the body axis of the minnow will be straight, as indicated in FIG. 14. Thus, the embodiment of elements 16 shown in FIG. 12 offers the option of a minnow with either a curved or a straight body axis. It is also possible, of course, to provide a one-piece minnow with a curved body axis, as shown in FIG. 15. This minnow corresponds in the same way to the FIG. 13 embodiment as the straight axis, one-piece minnow of FIG. 9 corresponds to the embodiment of FIG. 1.

Figure 16:
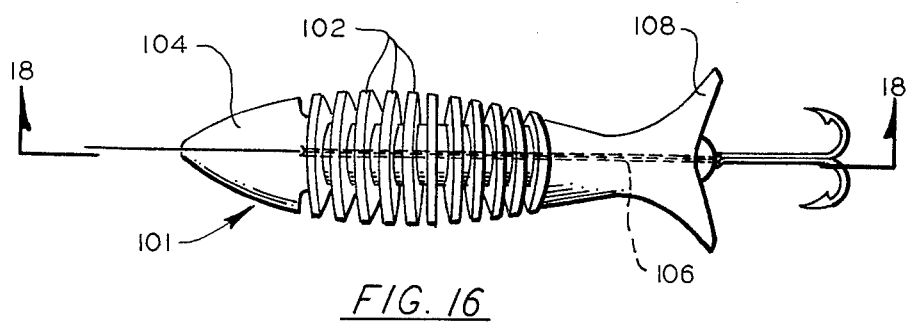
FIG. 16 is a side elevational view of yet another embodiment of the invention.
Figure 17:
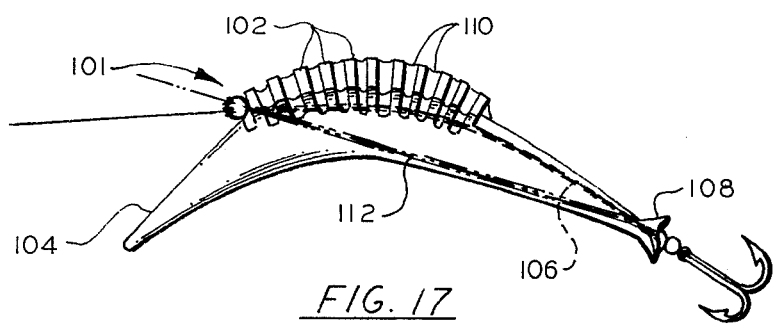
FIG. 17 is a plan view of the embodiment of FIG. 16.
Figure 18:
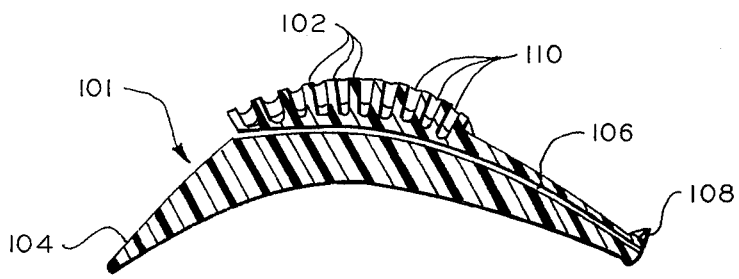
FIG. 18 is a plan view in section on the line 18—18 of FIG. 16.

Referring now to FIGS. 16–18, another embodiment is shown, minnow 101 having a curved body axis in plan view with ribs 102 formed in only one side. Hence, this embodiment is not necessarily symmetrical about the body axis. Head portion 104 may be flat on one side, in the interset of using less material, the entire minnow preferably being molded in one piece from plastic, or other suitable material.

Opening 106 extends from tail portion 108 through the minnow to a point at or near the juncture of ribs 102 and head portion 104. The opening may, but need not, extend through the head portion. Reinforcing webs 110 may be provided between ribs 102, formed integrally therewith, to reduce the possibility of breakage. Opening 106 may be curved along the body axis or extend straight through from the center of tail portion 108 to the point where it exits the body or head, as indicated in FIG. 17 by the opening numbered 112 which may be provided additionally or alternatively to opening 106. A wire rod may extend through such a straight opening, as in the FIG. 1 embodiment, which is particularly desirable for salt water use. The bearing between the end of the tail and the attachment of the hook is also provided, as shown, to allow free movement of the minnow about the rod which passes loosely through opening 112.

What is claimed is:

1. An artificial minnow for association with the hooked end of a fishing line or leader, said minnow comprising:
   a. a body having head and tail ends and a central portion;
   b. said body being symmetrically arranged about a central, longitudinal axis curved in plan view and having an opening extending therethrough for loose passage of a line or leader; and
   c. said central portion including a plurality of longitudinally spaced rib elements extending radially from said axis.

2. The invention according to claim 1 wherein said body is formed in a single piece of molded plastic.

3. The invention according to claim 2 wherein a transverse opening is provided in said head portion, communicating with said opening through said longitudinal axis to allow said line or leader to be optionally passed through either of said openings in said head portion.

4. The invention according to claim 1 and further including an anti-friction bearing member between said tail end of the minnow and the hooked end of the line or leader.

5. An artificial minnow for association with the hooked end of a fishing line or leader, said minnow comprising:
   a. a body having head and tail ends and a central portion;
   b. said body being symmetrically arranged about a central, longitudinal axis having an opening extending therethrough for loose passage of a line or leader;
   c. said central portion including a plurality of longitudinally spaced rib elements extending radially from said axis, each of said rib elements having planar edges and comprising separate pieces, each having at least one centrally disposed boss for contact with the adjacent rib element to provide the longitudinal spacing of said elements.

6. The invention according to claim 5 and further including an anti-friction bearing member between said tail end of the minnow and the hooked end of the line or leader.

7. The invention according to claim 5 wherein said rib elements each include a first boss extending from one surface, a second boss of smaller diameter extending from said first boss, and a recess extending into the opposite surface and of substantially the same diameter as said second boss, whereby the second boss of one rib element may be inserted in the recess of an adjacent rib element and the two elements will be separated by the first boss of said one element.

8. The invention according to claim 5 wherein the peripheral shape of said rib elements is oblong with pointed ends.

9. The invention according to claim 5 wherein the peripheral shape of said rib elements comprises a pair of concave surfaces extending from each of two pointed, opposite ends to a convex central portion.

10. The invention according to claim 5 wherein the peripheral shape of said rib elements comprises a concave and a convex surface extending from opposite sides of each of two pointed, opposite end portions, the concave surface extending from each end joining the convex surface extending from the other end.

11. The invention according to claim 5 wherein said head end of said body comprises a separate head element having both concave and convex surfaces.

12. The invention according to claim 5 wherein said means for imparting spin comprises at least one of said rib elements formed with a transverse twist, in the nature of a propeller blade.

13. The invention according to claim 5 wherein said longitudinal axis is straight.

14. The invention according to claim 5 wherein said rib elements each include a centrally disposed boss extending from one surface, and an annular lip extending from the opposite surface and defining an opening of substantially the same diameter as said boss, whereby the boss on one rib element may be inserted in the opening defined by the lip on the adjacent rib element.

15. The invention according to claim 14 wherein the peripheral surface of said annular lip lies in a plane other than normal to said longitudinal axis.

16. The invention according to claim 15 wherein a transverse opening is provided in said head portion, communicating with said opening through said longitudinal axis to allow said line or leader to be optionally passed through either of said openings in said head portion.

17. An artificial minnow for association with the hooked end of a fishing line or leader, said minnow comprising:
   a. a body formed of a single piece of molded plastic and having head and tail ends and a central portion;
   b. said body being symmetrically arranged about a central, longitudinal axis having an opening extending therethrough for loose passage of a line or leader;
   c. said central portion including a plurality of longitudinally spaced rib elements extending radially from said axis, each of said rib elements having planar edges; and d. said tail end being helically formed to impart spin to the minnow about said axis as the minnow is drawn through the water.

18. The invention according to claim 17 and further including an anti-friction bearing member between said tail end of the minnow and the hooked end of the line or leader.

19. An artificial minnow for association with the hooked end of a fishing line or leader, said minnow comprising:
 a. a body formed of a single piece of molded plastic and having head and tail ends and a central portion;
 b. said body having a longitudinal axis which is curved in plan view;
 c. said body having an opening extending therethrough for passage of a line or leader; and
 d. a plurality of longitudinally spaced rib elements extending radially from said central portion.

20. The invention according to claim 19 wherein said rib elements from said central portion for less than the entire circumference thereof.

21. The invention according to claim 20 and further including reinforcing webs extending between adjacent rib element.

22. The invention according to claim 19 wherein said opening extends from said tail portion to a point on one side of said body.

23. The invention according to claim 22 wherein said point is substantially at the juncture of said head and central portions of said body.

24. The invention according to claim 22 wherein said point is on the outside of the curve defining said longitudinal body axis.

* * * * *